(12) United States Patent
Aspinwall et al.

(10) Patent No.: US 6,318,288 B1
(45) Date of Patent: Nov. 20, 2001

(54) VEHICLE BUMPER LOCATOR

(76) Inventors: James B. Aspinwall; Signe K. Aspinwall, both of 516 N. 2$^{nd}$ West; Randell D. Archer, 3737 Village Dr., P.O. Box 1485, all of Riverton, WY (US) 82501

( * ) Notice: Subject to any disclaimer, the term of this patent is extended or adjusted under 35 U.S.C. 154(b) by 0 days.

(21) Appl. No.: 09/494,852

(22) Filed: Feb. 1, 2000

(51) Int. Cl.$^7$ ..................................... B61L 15/00
(52) U.S. Cl. ................ 116/30; 116/51; 248/291.1; 40/591
(58) Field of Search .................. 116/28 R, 30, 116/35 R, 46, 51, 52, 53, 54, 173, 209; 40/591, 592; 33/264; 248/292.13, 291.1; 403/113, 117, 119

(56) References Cited

U.S. PATENT DOCUMENTS

| | | | | |
|---|---|---|---|---|
| 451,251 | * | 4/1891 | Anderson | 248/291.1 |
| 1,877,428 | * | 9/1932 | Rensonnet | 33/264 |
| 2,121,525 | * | 6/1938 | Johnson | 116/28 R |
| 2,226,159 | * | 12/1940 | Hoffmann | 116/28 R |
| 3,141,253 | * | 7/1964 | Bartram | 116/28 R |
| 3,169,739 | * | 2/1965 | Yacobian | 116/173 |
| 3,433,203 | * | 3/1969 | Sharkey et al. | 116/173 |
| 3,608,513 | | 9/1971 | Gray . | |
| 3,858,924 | | 1/1975 | Bores . | |
| 3,998,285 | | 12/1976 | Cooper . | |
| 4,122,796 | * | 10/1978 | Pressler et al. | 116/28 RR |
| 4,755,791 | | 7/1988 | Kuroda . | |
| 5,520,141 | * | 5/1996 | Lutz | 116/173 |
| 5,732,927 | * | 3/1998 | Purpura | 116/173 |

FOREIGN PATENT DOCUMENTS

1324934 * 3/1963 (FR) ................... 116/28 R

* cited by examiner

*Primary Examiner*—Andrew H. Hirshfeld
(74) *Attorney, Agent, or Firm*—Henderson & Sturm LLP

(57) ABSTRACT

A vehicle bumper locator to be mounted to the existing license plate mounting holes of a vehicle. The bumper locator includes a horizontal frame member with openings that register with the license plate mounting holes. A bracket is pivotally attached to the frame near one end thereof. The bracket carries a resiliently mounted elongated rod that is movable between a vertical position visible to the driver, and a horizontal position extending parallel to the frame. Horizontal and vertical stops are attached to the frame and contact the bracket to limit its pivotal movement to a 90° arc.

4 Claims, 1 Drawing Sheet

VEHICLE BUMPER LOCATOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle accessories, and more particularly to a vehicle bumper locator.

2. Description of Related Art

As can be seen by reference to the following U.S. Pat. Nos. 3,608,513; 3,858,924; 3,998,285 and 4,755,791 the prior art is replete with myriad and diverse vehicle parking guides.

While all of the aforementioned prior art constructions are more than adequate for the basic purpose and function for which they have been specifically designed, they are uniformly deficient with respect to their failure to provide a simple, efficient, and practical vehicle bumper locator.

As a consequence of the foregoing situation, there has existed a longstanding need for a new and improved vehicle bumper locator and the provision of such a construction is a stated objective of the present invention.

BRIEF SUMMARY OF THE INVENTION

Briefly stated, the present invention provides a vehicle bumper locator to be mounted to the existing license plate mounting holes of a vehicle. The bumper locator includes a horizontal frame member with openings that register with the license plate mounting holes. A bracket is pivotally attached to the frame near one end thereof. The bracket carries a resiliently mounted elongated rod that is movable between a vertical position visible to the driver, and a horizontal position extending parallel to the frame. Horizontal and vertical stops are attached to the frame and contact the bracket to limit its pivotal movement to a 90° arc.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
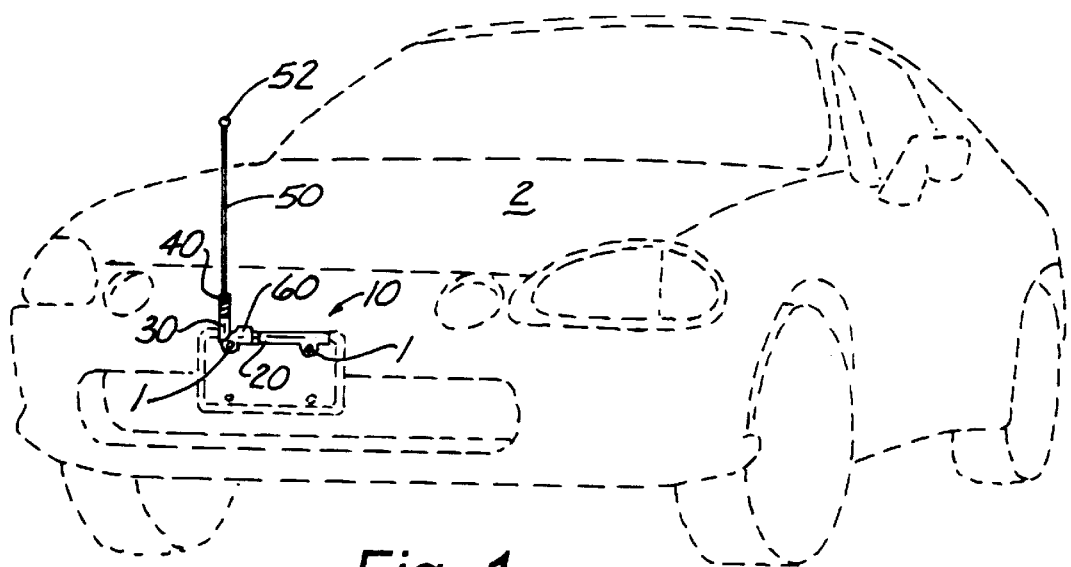
FIG. 1 is a perspective view showing the vehicle bumper locator of the present invention mounted in the vehicle's license plate mounting holes.

As can be seen by reference to the drawings, and in particularly to FIG. 1, The vehicle bumper locator that forms the basis of the present invention is designated generally by the reference number 10. The bumper locator 10 is adapted to be mounted using the license plate mounting holes 1 of the vehicle 2. The bumper locator 10 includes a horizontal frame 20 with openings 22 that are registerable with the vehicle license plate mounting holes 1.

Figure 2:
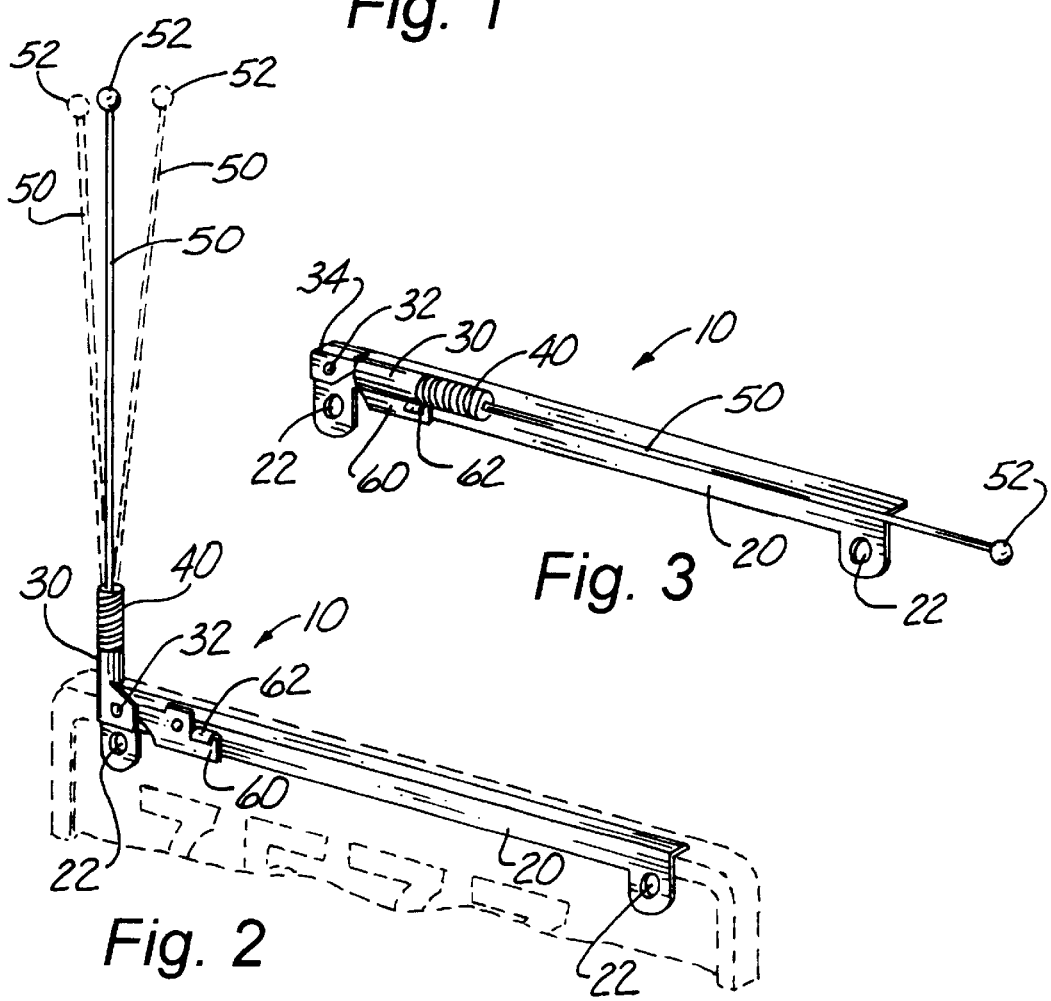
FIG. 2 is an enlarged perspective view showing the rod of the bumper locator in the vertical position visible to the driver.

A bracket 30 is pivotally attached to the frame 20 about a horizontal pivot point 32 and includes an inwardly extending ear 34. A spring 40 interconnects the bracket 30 and an elongated rod 50 having a ball nut 52 attached to its free end. The rod 50 is selectively movable between a vertical position (FIG. 2) visible to the driver, and a horizontal position (FIG. 3) used, for example, when the vehicle 2 is taken through a carwash.

Figure 3:
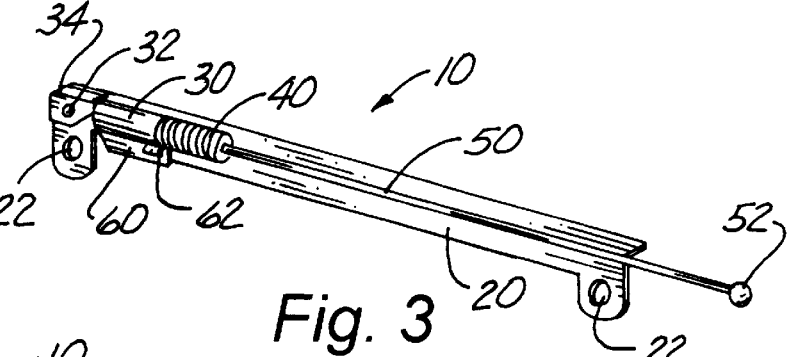
FIG. 3 is an enlarged perspective view showing the rod in the horizontal position.

A horizontal stop member 60 including an outwardly extending tab 62 is attached to the frame 20 and limits the downward pivotal movement of the rod 50 beyond that shown in FIG. 3. The ear 34 extending from the bracket 30 contacts the left edge of the frame 20 and limits the counterclockwise pivotal movement of the rod 50 to the vertical position shown in FIG. 2.

Many new cars and minivans have hoods with extreme slopes that make it difficult to judge the location of the front of the vehicle. When the bumper locator 10 of the present invention is in the vertical position (FIG. 2), the driver can see the ball nut 52 and top few inches of the rod 50 to help in accurately determining the location of the front of the vehicle.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A vehicle bumper locator for use in combination with a vehicle having horizontally spaced license plate mounting holes, the bumper locator comprising:

an elongated frame member including a pair of spaced openings disposed near opposite ends of the frame member and alignable with the vehicle license plate mounting holes;

a bracket pivotally attached about a horizontal axis to the frame member near one end thereof, and having an inwardly extending ear adapted to engage said one end for limiting the vertical movement of the bracket relative to the frame member; and, an elongated rod having one end operably attached to the bracket, the rod being selectively movable between a vertical position extending up from the frame member, and a horizontal position extending parallel to the frame member.

2. The bumper locator of claim 1 further including a spring attached to and interconnecting the bracket and the elongated rod.

3. The bumper locator of claim 1 further including a ball nut attached to another end of the elongated rod.

4. The bumper locator of claim 1 further including a horizontal stop member attached to the frame member and disposed to contact the bracket and limit its downward pivotal movement when the rod is in the horizontal position.

* * * * *